US009266562B2

(12) United States Patent
Yamazaki et al.

(10) Patent No.: US 9,266,562 B2
(45) Date of Patent: Feb. 23, 2016

(54) PARKING ASSIST DEVICE

(71) Applicants: Eriko Yamazaki, Toyota (JP); Hisashi Satonaka, Susono (JP); Michihito Shimada, Mishima (JP); Hironobu Ishijima, Miyoshi (JP); Hidehiko Miyoshi, Kariya (JP); Keisuke Hata, Toyota (JP)

(72) Inventors: Eriko Yamazaki, Toyota (JP); Hisashi Satonaka, Susono (JP); Michihito Shimada, Mishima (JP); Hironobu Ishijima, Miyoshi (JP); Hidehiko Miyoshi, Kariya (JP); Keisuke Hata, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 57 days.

(21) Appl. No.: 14/089,349

(22) Filed: Nov. 25, 2013

(65) Prior Publication Data

US 2014/0129091 A1     May 8, 2014

Related U.S. Application Data

(63) Continuation of application No. PCT/JP2012/078502, filed on Nov. 2, 2012.

(51) Int. Cl.
| | |
|---|---|
| A01B 69/00 | (2006.01) |
| B62D 6/00 | (2006.01) |
| B62D 11/00 | (2006.01) |
| B62D 15/02 | (2006.01) |
| B62D 5/04 | (2006.01) |
| B60W 30/06 | (2006.01) |

(52) U.S. Cl.
CPC .......... *B62D 15/0285* (2013.01); *B62D 5/0496* (2013.01); *B60W 30/06* (2013.01); *B62D 5/0481* (2013.01)

(58) Field of Classification Search
CPC .. B62D 15/0285; B62D 5/0481; B60W 30/06
USPC ........................................ 701/42, 41; 180/6.2
See application file for complete search history.

(56) References Cited

U.S. PATENT DOCUMENTS

2012/0072067 A1* 3/2012 Jecker et al. .................... 701/25
2013/0043989 A1* 2/2013 Niemz .......................... 340/438

FOREIGN PATENT DOCUMENTS

JP     2010-228591     10/2010

* cited by examiner

*Primary Examiner* — Tuan C. To
*Assistant Examiner* — Isaac Smith
(74) *Attorney, Agent, or Firm* — Finnegan, Henderson, Farabow, Garrett & Dunner, LLP

(57) ABSTRACT

A parking assist device assists entry or exit of a vehicle with respect to a parking space through an automatic control of a steering device. The parking assist device includes: a calculator that obtains, to perform the automatic control of the steering device, a path for allowing the vehicle to enter or exit the parking space based on the parking space, calculates an amount of temperature rise of the steering device at the execution of the automatic control for allowing the vehicle to move along the obtained path, and calculates a predicted temperature of the steering device at the execution of the automatic control by adding the calculated amount of temperature rise to a current value of the temperature of the steering device; and a controller that inhibits the execution of the automatic control when the predicted temperature is equal to or higher than a determination value.

12 Claims, 7 Drawing Sheets

PARKING ASSIST DEVICE

BACKGROUND OF THE INVENTION

The present invention relates to a parking assist device.

Vehicles like automobiles are known which are built with a parking assist device that assists parking of a vehicle to a predetermined parking space and starting of the vehicle from the parking space. According to such a parking assist device, operations to the steerable wheels of the vehicle for entry or exit of the vehicle with respect to a parking space are carried out through an automatic control of a steering device instead of a steering operation performed by the driver. The automatic control of the steering device enables operations to the steerable wheels for entry or exit of the vehicle with respect to a parking space without causing the driver to turn the steering wheel, and thus an assist to the entry or exit of the vehicle with respect to the parking space is realized.

Moreover, according to the parking assist device, when the entry or exit of the vehicle with respect to a parking space is assisted, operations to the steerable wheels are carried out through an automatic control of the steering device without causing the driver to turn the steering wheel, and thus the load to the steering device becomes large when executing the automatic control resulting in a tendency for the temperature of the steering device to increase. In order to avoid the occurrence of a failure of the steering device due to an excessive increase of the temperature thereof, for example, Japanese Laid-Open Patent Publication No. 2010-228591 discloses to inhibit the execution of the automatic control when the temperature of the steering device is out of a first temperature range in the automatic control.

SUMMARY OF THE INVENTION

Meanwhile, in order to reliably suppress an excessive increase of the temperature of the steering device while an automatic control thereon is executed, it is preferable that the maximum value of the first temperature range should be set to be low in such a way that the execution of the automatic control is adequately inhibited under the worst condition with respect to the temperature rise of the steering device under the automatic control. When, however, the maximum value of the first temperature range is set in this manner, the execution condition of the automatic control becomes strict, and thus it is unavoidable that an opportunity of executing the automatic control becomes little.

Japanese Laid-Open Patent Publication No. 2010-228591 also discloses that an automatic control in execution is terminated when the temperature of the steering device becomes higher than the maximum value of a second temperature range, which is lower than the first temperature range, during the execution of the automatic control. In this case, if the maximum value of the first temperature range is set to be high to ease the execution condition of the automatic control and to increase the opportunities for executing the automatic control, when the temperature of the steering device becomes higher than the maximum value of the second temperature range during the execution of the automatic control, such an automatic control is terminated to avoid an excessive increase of the temperature of the steering device.

However, when the automatic control in execution is terminated in mid-course, i.e., when entry or exit of the vehicle with respect to a parking space through the automatic control cannot be completed, the following disadvantage occurs. That is, after the automatic control is terminated in mid-course, it becomes necessary for the driver to re-start the entry or exit of the vehicle with respect to the parking space through a manual steering operation, resulting in more effort for the driver.

Accordingly, it is an objective of the present invention to provide a parking assist device that can increase opportunities for executing an automatic control of a steering device to assist entry or exit of a vehicle with respect to a parking space and does not terminate the executing automatic control in mid-course due to a temperature rise of the steering device.

A parking assist device that addresses the above-described disadvantages assists the entry or exit of a vehicle with respect to a parking space through an automatic control of a steering device. A first calculator of the parking assist device calculates an amount of temperature rise of the steering device that accompanies the execution of the automatic control based on the margin of the dimension of the parking space relative to the size of the vehicle to execute the automatic control of the steering device. There is a tendency that the smaller the margin of the dimension of the parking space relative to the size of the vehicle is, the larger the load to activate the steering device becomes when the entry or exit of the vehicle with respect to the parking space is performed through the automatic control of the steering device. Accordingly, the amount of temperature rise of the steering device that accompanies the execution of the automatic control increases. The first calculator calculates the amount of temperature rise of the steering device in consideration of this fact. Moreover, a second calculator of the parking assist device adds the amount of temperature rise calculated by the first calculator to the current value of the temperature of the steering device, thereby calculating the predicted temperature of the steering device when the automatic control is executed. Furthermore, a controller of the parking assist device permits the execution of the automatic control when the predicted temperature of the steering device calculated by the second calculator is lower than a determination value, but inhibits the execution of the automatic control when the predicted temperature is equal to or higher than the determination value. Hence, only when it is predicted that the temperature of the steering device that accompanies the execution of the automatic control thereon becomes a high temperature that is equal to or higher than the determination value, the execution of the automatic control is inhibited, but the execution of the automatic control is permitted in other cases. Accordingly, the opportunities for the automatic control are increased as much as possible. Moreover, whether to permit or inhibit the execution of the automatic control of the steering device is determined prior to the execution of the automatic control. Furthermore, after the execution of the automatic control is permitted and is started, the automatic control is not terminated due to the temperature rise of the steering device until the entry or exit of the vehicle with respect to the parking space completes.

The first calculator preferably obtains a path for allowing the vehicle to enter or exit the parking space based on the margin of the dimension of the parking space relative to the size of the vehicle and calculates the amount of temperature rise of the steering device at the execution of the automatic control of the steering device for allowing the vehicle to move along the obtained path. The amount of temperature rise of the steering device when the automatic control is performed on the steering device changes in accordance with the path for allowing the vehicle to enter or exit the parking space, and such a path changes in accordance with the margin of the dimension of the parking space relative to the size of the vehicle. Hence, by calculating the amount of temperature rise of the steering device when the automatic control is performed as described above, the calculated amount of temperature rise can be a further accurate value, and thus the predicted temperature of the steering device can be a further accurate value.

When obtaining the path for allowing the vehicle to enter or exit the parking space, the first calculator preferably considers, in addition to the margin of the dimension of the parking space relative to the size of the vehicle, a dimension of a peripheral space utilized for the vehicle to enter or exit the parking space. The optimized path for allowing the vehicle to enter or exit the parking space through the automatic control of the steering device varies depending on not only the margin of the dimension of the parking space relative to the size of the vehicle, but also the dimension of a peripheral space utilized for the vehicle to enter or exit the parking space. Hence, by obtaining the path as described above, such a path can be a path with the minimum amount of temperature rise of the steering device when the automatic control is performed on the steering device. As a result, the predicted temperature of the steering device can be suppressed to a low temperature, and thus the opportunities for executing the automatic control of the steering device can be increased.

The first calculator preferably obtains, as the path for allowing the vehicle to enter the parking space, a path by which parking of the vehicle at the parking space is completed. In this case, the automatic control is performed on the steering device to move the vehicle along the obtained path, the automatic control is continuously performed until the parking of the vehicle at the parking space completes after the vehicle starts entering the parking space. Accordingly, the burden on the driver when attempting to park the vehicle at the parking space can be reduced.

Also, the first calculator preferably obtains, as the path for allowing the vehicle to enter the parking space, a path by which the vehicle starts to enter the parking space. In this case, the automatic control of the steering device is performed to move the vehicle along the obtained path, and the automatic control is continuously performed until the vehicle first starts entering the parking space. Subsequently, the driver completes the parking of the vehicle at the parking space through a manual steering operation. Hence, the moving distance when the vehicle is caused to move along the path through the automatic control of the steering device can be shortened, and thus the amount of temperature rise of the steering device that accompanies the execution of the automatic control can be suppressed to a low level. As a result, the predicted temperature of the steering device can be suppressed to a low temperature, thereby increasing the opportunities for executing the automatic control of the steering device.

In another aspect of the present disclosure, a parking assist device that addresses the above-described disadvantages assists entry or exit of a vehicle with respect to a parking space through an automatic control of a steering device. The parking assist device includes a calculator and a controller. The calculator obtains, to perform the automatic control of the steering device, a path for allowing the vehicle to enter or exit the parking space based on the parking space, calculates an amount of temperature rise of the steering device at the execution of the automatic control for allowing the vehicle to move along the obtained path, and calculates a predicted temperature of the steering device at the execution of the automatic control by adding the calculated amount of temperature rise to a current value of the temperature of the steering device. The controller inhibits the execution of the automatic control when the predicted temperature calculated by the calculator is equal to or higher than a determination value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

DETAILED DESCRIPTION OF THE PREFERRED EMBODIMENTS

A parking assist device according to one embodiment will now be described with reference to FIGS. 1 to 12.

Figure 1:
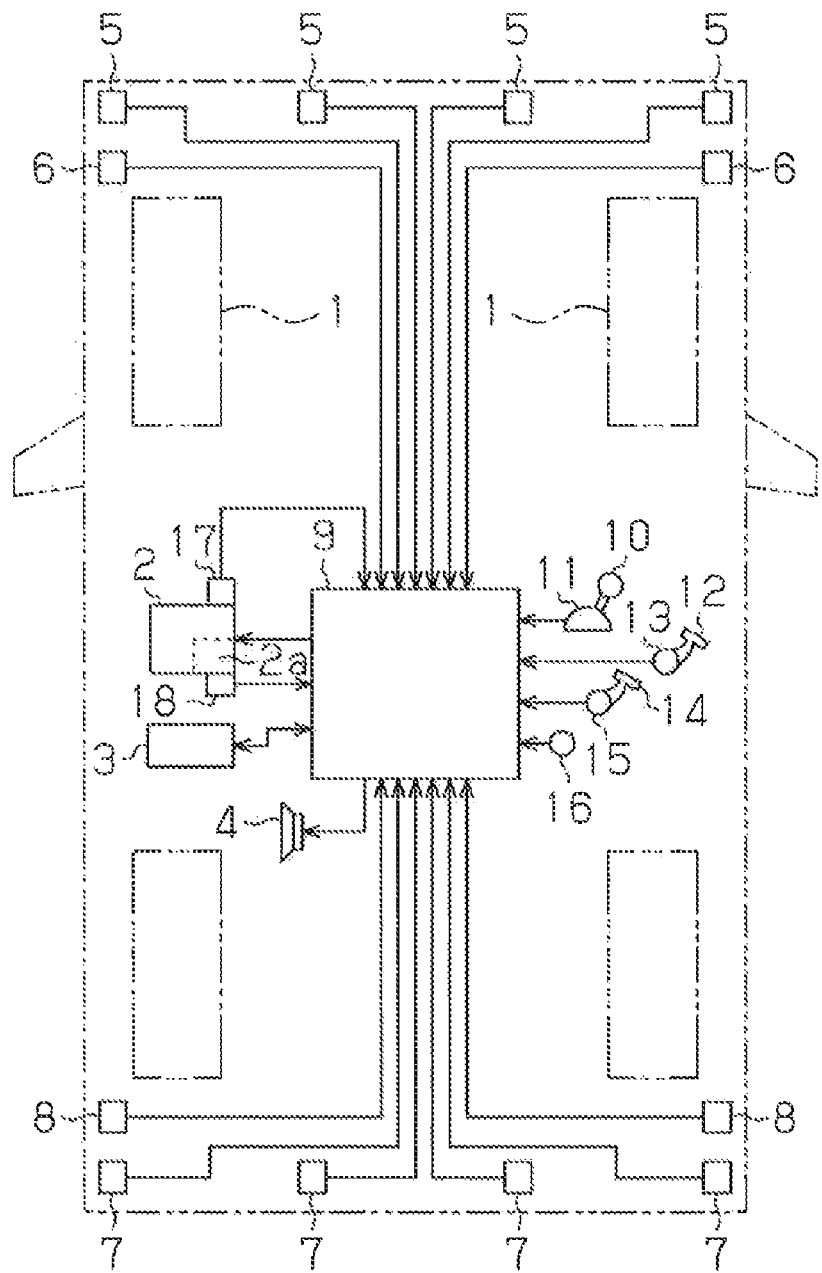
FIG. 1 is a schematic diagram illustrating a whole vehicle to which a parking assist device is applied.

A vehicle illustrated in FIG. 1 is provided with a steering device 2 that operates steerable wheels 1 to adjust the travelling direction of the vehicle. The steering device 2 is to operate the steerable wheels 1 through a steering operation by a driver, and has a function of assisting the steering operation by the driver with a motor 2a. The steering device 2 is capable of operating the steerable wheels 1 by only the motor 2a regardless of the presence/absence of a steering operation by the driver. Provided at the driver's space in the vehicle are a display panel 3, which displays various information on a driving and accepts various operations from the driver, and a speaker 4, which notifies the driver of information or an alert on the driving by sound.

In the vehicle, multiple clearance sonars 5 to detect the presence/absence of an object present near the front end (upper end in the drawing) of the vehicle are provided at such front end, and ultrasound sensors 6 to detect the presence/absence of an object present at an area beside the vehicle in the lateral direction (horizontal direction in the drawing) are attached to respective front side faces of the vehicle in the lateral direction. Moreover, multiple clearance sonars 7 to detect the presence/absence of an object near the rear end (bottom end in the drawing) of the vehicle are provided at such rear end, and ultrasound sensors 8 to detect the presence/absence of an object present at an area beside the vehicle in the lateral direction are attached to respective rear side faces of the vehicle in the lateral direction.

The clearance sonars 5 and 7, and ultrasound sensors 6 and 8 are coupled to an electronic control unit 9 to perform various controls on the vehicle. Coupled to this electronic control unit 9 are a shift position sensor 11 that detects a operated position of a shift lever 10 operated by the driver, an accelerator position sensor 13 that detects an operated amount of an accelerator pedal 12 stepped on by the driver, and a brake switch 15 that detects the presence/absence of a depressing operation to a brake pedal 14 by the driver. Furthermore, the electronic control unit 9 is coupled with a wheel speed sensor 16 that detects a rotation speed of a wheel (e.g., a steerable wheel 1) of the vehicle, an angular sensor 17 that detects a steering angle of the steering device 2, and a temperature sensor 18 that detects the temperature of the motor 2a in the steering device 2.

The electronic control unit 9 drives and controls the steering device 2, the display panel 3, and the speaker 4, and receives signals from the display panel 3 based on an operation given to the display panel 3 by the driver. The electronic control unit 9 assists entry or exit of the vehicle with respect to a parking space when the vehicle is parked at the predetermined parking space or is started therefrom. That is, the electronic control unit 9 operates the steerable wheels 1 to cause the vehicle to enter or exit a parking space through an automatic control of the steering device 2 (the motor 2a) instead of a steering operation by the driver, thereby assisting the entry or exit of the vehicle with respect to the parking space.

Such a parking assist is started when there is a request for an assist to enter the vehicle in a parking space (hereinafter, referred to as an entry assist) or a request for an assist to exit the vehicle from the parking space (hereinafter, referred to as an exit assist) based on an operation or the like given to the display panel 3 by the driver. The summary of the entry assist and that of the exit assist will be described below separately.

[Entry Assist]

When an entry assist is started as a parking assist, the electronic control unit 9 instructs, through a display on the display panel 3 or sound from the speaker 4, the driver to perform a measurement starting operation as a preparation for measuring the dimension of a parking space. More specifically, the electronic control unit instructs the driver to stop a vehicle A at a position indicated by solid lines in FIG. 2, i.e., a position facing an area beside a parking space P1 between other vehicles B and C, or a position from which the vehicle A can reach the area beside the parking space P1 immediately after starting to advance. With the vehicle A being stopped at such a position, the electronic control unit instructs the driver to cancel a depressing operation to the brake pedal 14 with the shift lever 10 (see FIG. 1) being shifted in the drive position.

Upon execution of the above-described measurement starting operation by the driver, the electronic control unit 9 executes a measuring process of measuring the dimension of the parking space P1 (see FIG. 2) using the clearance sonars 5 and 7 and the ultrasound sensors 6 and 8. In this measuring process, the vehicle A is advanced from the position indicated by the solid lines in FIG. 2 to a position indicated by broken lines in which a long dash alternates with a pair of short dashes, i.e., a position ahead of the area beside the parking space P1 right after the advancing vehicle A has passed through the area beside the parking space. While the vehicle A moves from the position indicated by the solid lines to the position indicated by broken lines in which a long dash alternates with a pair of short dashes, the electronic control unit 9 monitors signals from the clearance sonars 5 and 7 and the ultrasound sensors 6 and 8 illustrated in FIG. 1, and leans the dimension of the parking space P1 and the relative position of the vehicle A to the parking space P1 based on the signals from the sensors.

Figure 2:
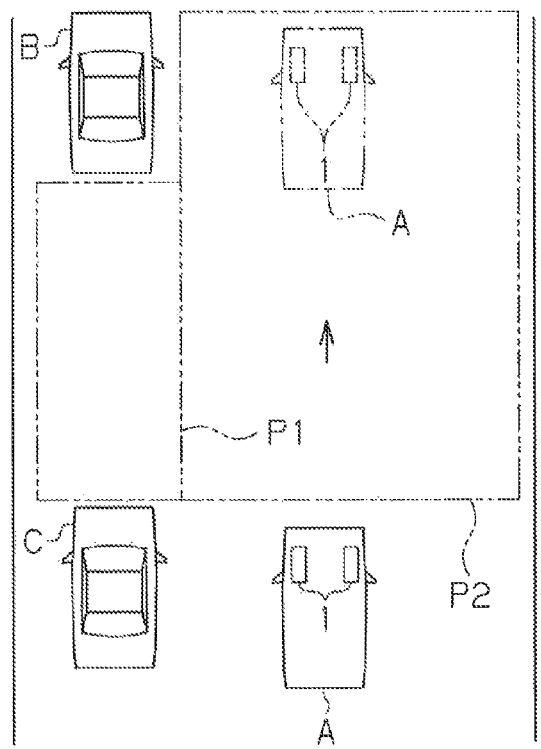
FIG. 2 is a schematic diagram illustrating a motion of a vehicle when the dimension of a parking space is measured.
Figure 3:
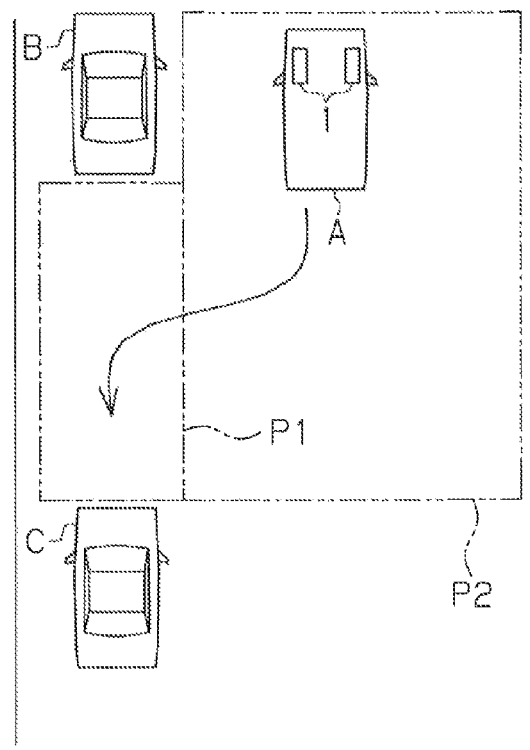
FIG. 3 is a schematic diagram illustrating how the vehicle is parked through an automatic control of a steering device.

Next, the electronic control unit 9 obtains an entry path of the vehicle A to the parking space P1 from the position of the vehicle A indicated by the broken lines in which a long dash alternates with a pair of short dashes in FIG. 2 based on the margin of the dimension of the parking space P1 relative to the size of the vehicle A. When obtaining such a path, it is preferable to also consider the dimension of a peripheral space P2 for allowing the vehicle A to enter the parking space P1 in addition to the margin of the dimension of the parking space P1 relative to the size of the vehicle A as described above. The dimension of the peripheral space P2 can be learned based on signals from the clearance sonars 5 and 7 and the ultrasound sensors 6 and 8 simultaneously when learning the size of the parking space P1 through the measuring process.

The electronic control unit 9 instructs the driver to operate the accelerator pedal 12, the brake pedal 14, and the shift lever 10 to move the vehicle A along the path obtained as described above and performs an automatic control of the steering device 2 (the motor 2a) in accordance with the operation by the driver based on the instruction. In this automatic control, the steerable wheels 1 are operated to realize a movement of the vehicle A along the path only by the driving on the motor 2a of the steering device 2 without causing the driver to turn the steering wheel. Hence, entry of the vehicle A to the parking space P1 and further the parking of the vehicle A at the parking space P1 together with the entry are assisted. When the entry of the vehicle A to the parking space P1 is assisted, in addition to the above-described automatic control of the steering device 2, an adjustment of the driving force of the vehicle A to move along the path, activation of the brake, and a shift position change may be automatically carried out.

FIGS. 3 to 8 illustrate an example operation of the steerable wheels 1 based on the automatic control of the steering device 2 when the vehicle A is moved along the path. In this automatic control, as indicated by an arrow in FIG. 3, the steerable wheels 1 are operated through activation of the motor 2a of the steering device 2 in such a way that the vehicle A enters the parking space P1. Subsequently, with the vehicle A being stopped at a position illustrated in FIG. 4, the steerable wheels 1 are operated through activation of the motor 2a in such a way that the steerable wheels 1 are directed to the left maximally in the drawing. After the directions of the steerable wheels 1 are changed in this manner, the steerable wheels 1 are operated through activation of the motor 2a of the steering device 2 in such a way that the vehicle A moves in the parking space P1 as indicated by an arrow in the drawing. Thereafter, with the vehicle A being stopped at a position illustrated in FIG. 5, the steerable wheels 1 are operated through activation of the motor 2a in such a way that the steerable wheels 1 are directed to the right maximally in the drawing. After the directions of the steerable wheels 1 are changed in this manner, the steerable wheels 1 are operated through activation of the motor 2a of the steering device 2 in such a way that the vehicle A moves in the parking space P1 as indicated by an arrow in the drawing.

Figure 8:
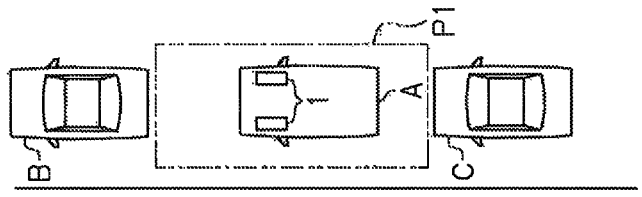
FIG. 8 is a schematic diagram illustrating how the vehicle is parked through the automatic control of the steering device.
Figure 7:
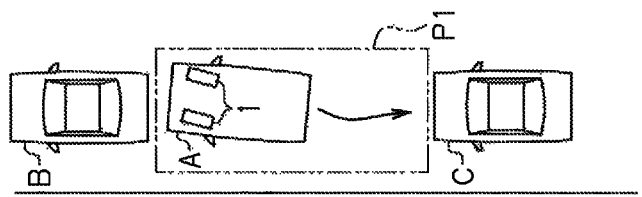
FIG. 7 is a schematic diagram illustrating how the vehicle is parked through the automatic control of the steering device.
Figure 6:
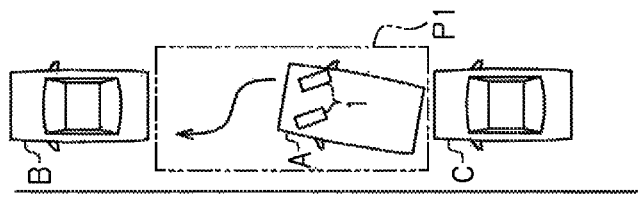
FIG. 6 is a schematic diagram illustrating how the vehicle is parked through the automatic control of the steering device.
Figure 5:
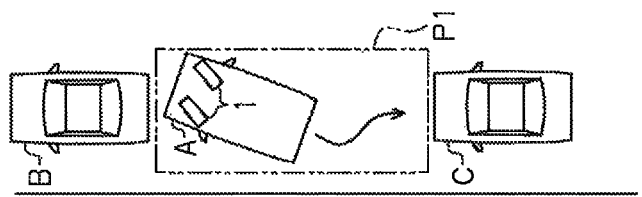
FIG. 5 is a schematic diagram illustrating how the vehicle is parked through the automatic control of the steering device.
Figure 4:
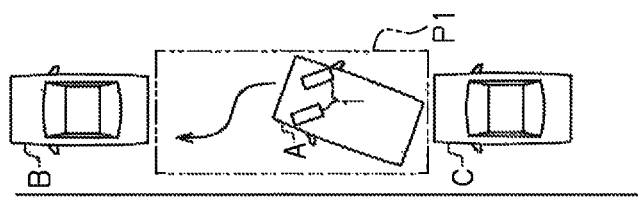
FIG. 4 is a schematic diagram illustrating how the vehicle is parked through the automatic control of the steering device.

Thereafter, with the vehicle A being stopped at a position illustrated in FIG. 6, the steerable wheels 1 are operated through activation of the motor 2a in such a way that the steerable wheels 1 are directed to the left to some extent in the drawing. After the directions of the steerable wheels 1 are changed in this manner, the steerable wheels 1 are operated through activation of the motor 2a of the steering device 2 in such a way that the vehicle A moves in the parking space P1 as indicated by an arrow in the drawing. Subsequently, with the vehicle A being stopped at a position illustrated in FIG. 7, the steerable wheels 1 are operated through activation of the motor 2a in such a way that the steerable wheels 1 are directed to the right to some extent in the drawing. After the directions of the steerable wheels 1 are changed in this manner, the steerable wheels 1 are operated through activation of the motor 2a of the steering device 2 in such a way that the vehicle A moves in the parking space P1 as indicated by an arrow in the drawing. As a result, as illustrated in FIG. 8, the vehicle A moves to and stops at a parking position in the parking space P1, thereby completing the parking of the vehicle A in the parking space P1.

Figure 9:
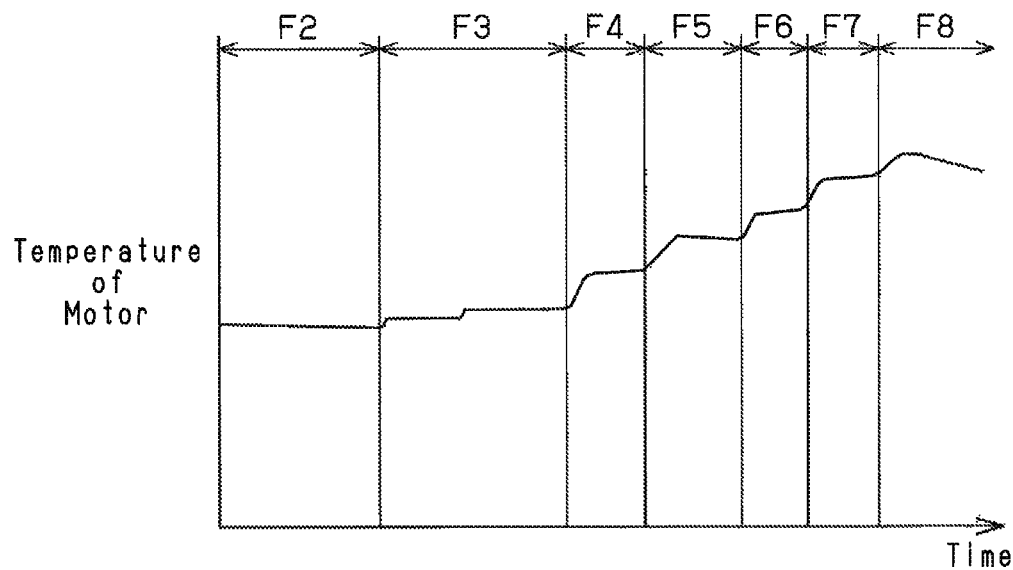
FIG. 9 is a time chart illustrating how the temperature of a motor rises in the steering device at the execution of the automatic control.
Figure 10:
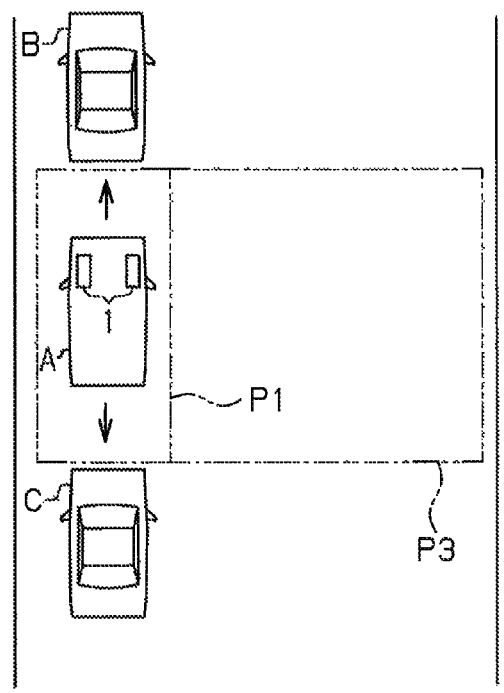
FIG. 10 is a schematic diagram illustrating a motion of a vehicle when the dimension of a parking space is measured.

FIG. 9 is a time chart illustrating changes of a temperature of the steering device 2 (in this example, the motor 2a) when the vehicle A is moved along the path illustrated in the example cases in FIGS. 2 to 8 through the automatic control of the steering device 2. In FIG. 9, changes of a temperature of the motor 2a within regions F2 to F8 corresponds to changes of a temperature of the motor 2a in the conditions illustrated in FIGS. 2 to 8, respectively. According to the steering device 2, since a current flows through a control device (ECU) for controlling the motor 2a in addition to the motor 2a at the time of energization thereof to drive the motor 2a, the ECU is also subjected to a temperature rise in the same manner as the temperature of the motor 2a rises.

As is clear from FIG. 9, the temperature rise of the motor 2a in the regions F4 to F8 is larger than the amount of temperature rise of the motor 2a in the regions F2 and F3.

This is because when the motor 2a is activated to change the directions of the steerable wheels 1 with the vehicle A being stopped, the load of the motor 2a is large in comparison with a case in which an operation of changing the directions of the steerable wheels 1 through activation of the motor 2a under the running condition of the vehicle A, and thus the temperature rise of the motor 2a is likely to occur. That is, in the regions F2 and F3, no operation of changing the directions of the steerable wheels 1 is performed through activation of the motor 2a with the vehicle A being stopped. In contrast, in the regions F4 to F8, an operation of changing the directions of the steerable wheels 1 is performed through activation of the motor 2a with the vehicle A being stopped. Those are the factors of the increase of the amount of temperature rise of the motor 2a within the regions F4 to F8 in comparison with the regions F2 and F3.

[Exit Assist]

When an exit assist starts as a parking assist, the electronic control unit 9 instructs, through a display on the display panel 3 or sounds from the speaker 4, the driver to carry out a measurement starting operation as a preparation for measuring the dimension of a parking space. More specifically, with the vehicle A being in the parking space P1 as indicated by solid lines in FIG. 10, the electronic control unit instructs the driver to cancel the stepping operation on the brake pedal 14 and to change the shift lever 10 (see FIG. 1) to the drive position.

Upon execution of the above-described measurement starting operation by the driver, the electronic control unit 9 executes a measuring process for measuring the dimension of the parking space P1 (see FIG. 10) using the clearance sonars 5 and 7 and the ultrasound sensors 6 and 8. As the measuring process, the electronic control unit 9 monitors signals from the clearance sonars 5 and 7 and the ultrasound sensors 6 and 8 all illustrated in FIG. 1, and moves the vehicle A back and forth reciprocally as indicated by an arrow in FIG. 10 so as not to hit obstacles like the vehicle B and the vehicle C. Moreover, the electronic control unit 9 monitors signals from the clearance sonars 5 and 7 and the ultrasound sensors 6 and 8 at the time of reciprocal movement, and learns the dimension of the parking space P1 and the relative position of the vehicle A to the parking space P1 based on the signals from the sensors.

Next, the electronic control unit 9 obtains a path for allowing the vehicle A to exit the parking space P1 where the vehicle A is parked based on a margin of the dimension of the parking space P1 relative to the size of the vehicle A. When obtaining such a path, it is preferable to consider the dimension of a peripheral space P3 for allowing the vehicle A to exit the parking space P1 in addition to the margin of the dimension of the parking space P1 to the size of the vehicle A as described above. The dimension of the peripheral space P3 can be learned based on signals from the clearance sonars 5 and 7 and the ultrasound sensors 6 and 8 simultaneously with the learning of the dimension of the parking space P1 through the measuring process.

The electronic control unit 9 gives instructions to the driver relating to operations of the accelerator pedal 12, the brake pedal 14, and the shift lever 10 to move the vehicle A along the path obtained as described above, and performs an automatic control of the steering device 2 (motor 2a) in accordance with the operation by the driver based on the instructions. In this automatic control, the steerable wheels 1 are operated to realize a movement of the vehicle A along the path only by the driving of the motor 2a of the steering device 2 without causing the driver to turn the steering wheel. The exit (start) of the vehicle A from the parking space P1 is thus assisted in this manner. When the exit of the vehicle A from the parking space P1 is assisted, as described above, in addition to the automatic control of the steering device 2, an adjustment of the driving force of the vehicle A to move along the path, activation of the brake, and a shift position change may be automatically carried out.

In the automatic control of the steering device 2 when the vehicle A is moved along the path, for example, the motor 2a is driven to perform reverse operations to the operations of the steerable wheels 1 when the vehicle A is parked at the parking space P1 illustrated in FIGS. 3 to 8. In this automatic control of the steering device 2 at this time, also, when an operation for changing the directions of the steerable wheels 1 through activation of the motor 2a with the vehicle A being stopped is performed, the temperature rise of the motor 2a and that of the ECU become larger than those of a case in which the directions of the steerable wheels 1 are changed through activation of the motor 2a under the running condition of the vehicle A.

Meanwhile, in such an automatic control of the steering device 2 by the parking assist device, the operations of the steerable wheels 1 are carried out by only the activation of the motor 2a without causing the driver to turn the steering wheel, and thus the load on the motor 2a increases, resulting in a temperature rise of the motor 2a. In order to avoid the occurrence of a failure of the steering device due to an excessive increase of the temperature of the motor 2a, in executing the automatic control, the execution of such an automatic control of the steering device 2 may be inhibited when the temperature of the motor 2a is equal to or higher than a determination value. When, however, the determination value is set to be a value (a low value) that is strict to an execution condition of the automatic control of the steering device 2 in such a way that the execution of the automatic control is adequately inhibited under the worst condition together with the temperature rise of the motor 2a and that of the ECU under the automatic control of the steering device 2, the opportunities for executing the automatic control decrease.

Moreover, the determination value may be set to be a high value in order to increase the opportunities for executing the automatic control, the temperature of the motor 2a during the execution of the automatic control may be monitored, and when the temperature of the motor excessively increases, the automatic control may be terminated in mid-course to avoid a failure due to the temperature rise of the motor 2a and that of the ECU. When, however, the automatic control is terminated in mid-course, it becomes necessary for the driver to start over entry (parking) or exit (start) of the vehicle A with respect to the parking space P1 through a manual steering operation by the driver after the termination of the automatic control, getting into even more effort for the driver.

In order to address such disadvantages, according to the parking assist device of this embodiment, the following processes (a) to (c) are performed through the electronic control unit 9.

(a) To execute an automatic control of the steering device 2, an amount of temperature rise TU of the steering device 2 (motor 2a) that accompanies the execution of the automatic control of the steering device 2 is calculated based on the margin of the dimension of the parking space P1 relative to the size of the vehicle A. The electronic control unit 9 when executing this process serves as a first calculator.

(b) The amount of temperature rise TU calculated in (a) is added to a current value of a temperature Tr of the steering device 2 (the motor 2a) to calculate a predicted temperature T1 of the motor 2a when the automatic control is executed. The electronic control unit 9 when executing this process serves as a second calculator.

(c) When the predicted temperature T1 calculated in (b) is lower than a determination value, the execution of the automatic control is permitted. In contrast, when the predicted temperature T1 is equal to or higher than the determination value, the execution of the automatic control is inhibited. The electronic control unit 9 when executing this process serves as a controller.

Next, a description will be given of an operation of the parking assist device.

When, as the parking assist through an automatic control of the steering device 2, the above-described entry assist or exit assist is performed, the smaller the margin of the dimension of the parking space P1 relative to the size of the vehicle A, the larger the load on the motor 2a driven to realize the automatic control becomes. Thus the amount of temperature rise of the motor 2a that accompanies the execution of the automatic control is likely to be large. In consideration of this fact, the amount of temperature rise TU of the motor 2a calculated through the process (a) is calculated to be a larger value as the margin of the dimension of the parking space P1 relative to the size of the vehicle A becomes smaller. Hence, through the processes (a) to (c), only when it is predicted that the temperature of the motor 2a becomes a high temperature that is equal to or higher than the determination value due to the execution of the automatic control of the steering device 2, i.e., only when the predicted temperature T1 becomes a high temperature that is equal to or higher than the determination value, the execution of the automatic control is inhibited, but the execution of the automatic control is permitted in other conditions. Accordingly, the execution opportunities for the automatic control of the steering device 2 can be increased as much as possible. Moreover, whether to permit or inhibit the execution of the automatic control on the steering device 2 is determined prior to the execution of the automatic control. Furthermore, after the execution of the automatic control is permitted and the execution thereof starts, the automatic control is not terminated due to the temperature rise of the motor 2a until the entry or exit of the vehicle A with respect to the parking space P1 by the automatic control completes.

Figure 11:
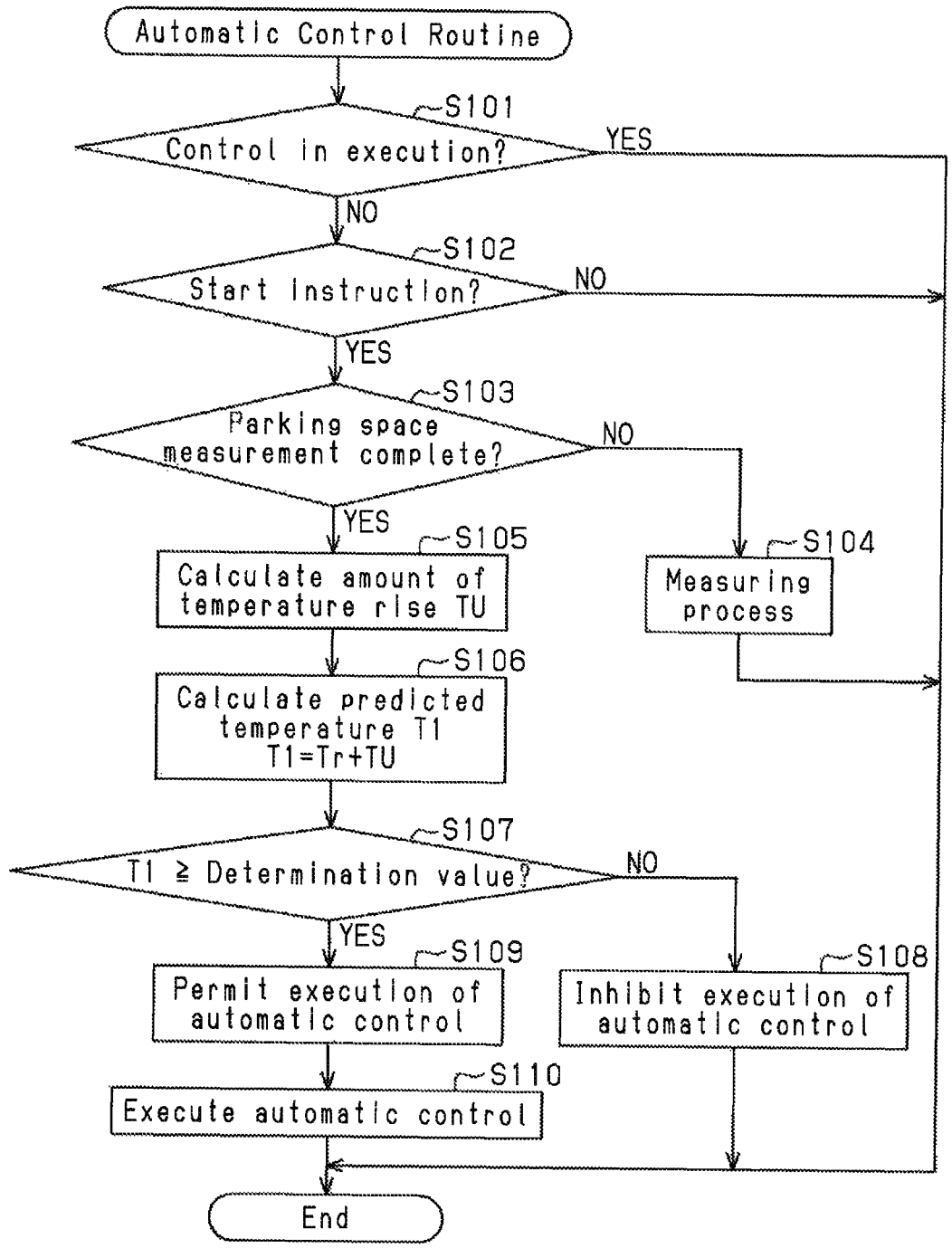
FIG. 11 is a flowchart illustrating procedures of executing the automatic control.
Figure 12:
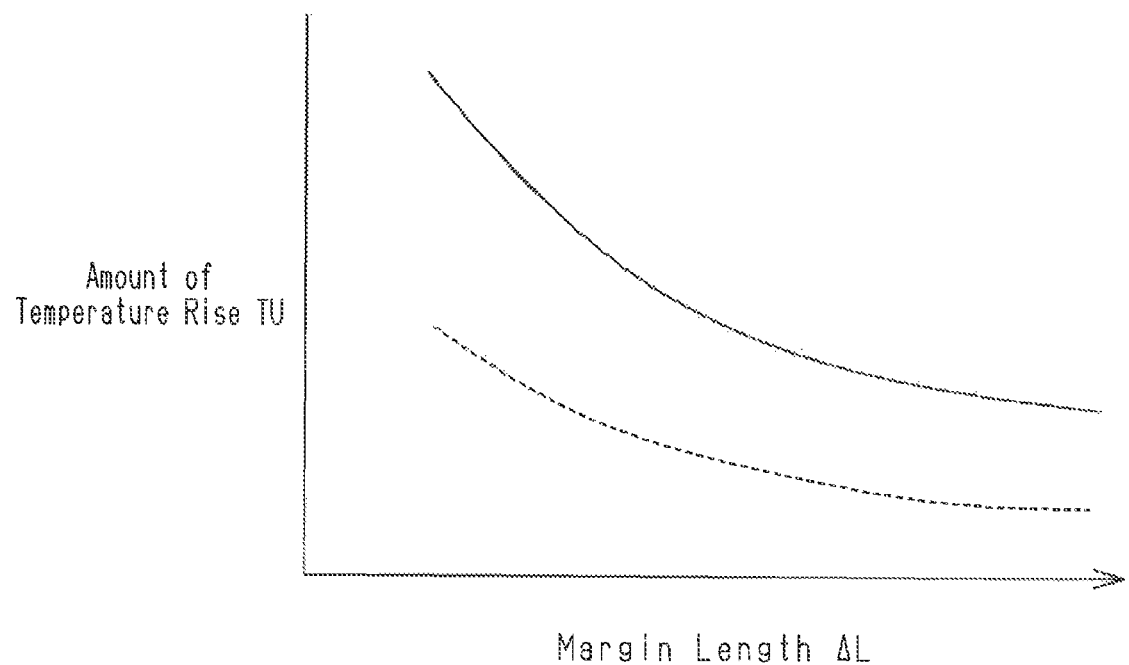
FIG. 12 is a graph illustrating a change in an amount of temperature rise based on a change in a margin length.

FIG. 11 is a flowchart illustrating an automatic control routine that inhibits or permits the automatic control of the steering device 2 based on the predicted temperature T1. This automatic control routine is periodically executed through the electronic control unit 9 as an interruption at predetermined time intervals.

As a process in step 101 (S101) in the routine, the electronic control unit 9 determines whether or not the automatic control of the steering device 2 is currently executed. When the determination result is YES in this step, the electronic control unit 9 temporarily suspends the automatic control routine. In contrast, when the determination result is NO in S101, the process progresses to S102. As a process in S102, the electronic control unit 9 determines whether or not a start of entry assist or exit assist is instructed. The start instruction of such entry assist or exit assist is made based on a request for parking assist through an operation given to the display panel 3 by the driver, more specifically, a request for entry assist or a request for exit assist. When the determination result is NO in S102, the electronic control unit 9 temporarily suspends the automatic control routine. In contrast, when the determination result in S102 is YES, the process progresses to S103.

As a process in S103, the electronic control unit 9 determines whether or not a measurement of the dimension of the parking space P1 has completed. When the determination result is NO in this step, the process progresses to S104. As a process in S104, the electronic control unit 9 executes the measuring process for measuring the dimension of the parking space P1. More specifically, upon execution of the measurement starting operation by the driver in an entry assist or an exit assist, the measuring process is executed to measure the dimension of the parking space P1 through this measuring process. When the measurement of the dimension of the parking space P1 through the measuring process completes, the determination result in S103 becomes YES, and the process progresses to S105. The process in S105 corresponds to the process (a).

As a process in S105, the electronic control unit 9 calculates the amount of temperature rise TU of the motor 2a of the steering device 2 due to the execution of the automatic control of the steering device 2. More specifically, as a margin of the dimension of the parking space P1 relative to the size of the vehicle A, a margin length $\Delta L$ is calculated that is a value obtained by subtracting the length (whole length, of the vehicle A in the fore-and-aft direction from the length of the parking space P1 in the fore-and-aft direction of the vehicle A (the length in the vertical direction in FIGS. 2 to 8). The smaller the value of the margin length $\Delta L$ is, the greater the number of operations to the steerable wheels 1 to change the directions thereof with the vehicle A being stopped becomes in a path for parking the vehicle A at the parking space P1 or a path for allowing the vehicle A to exit the parking space P1. The greater the number of operations, the larger the load on the motor 2a becomes when the vehicle A is caused to move along the path through the automatic control of the steering device 2, and thus the amount of temperature rise of the motor 2a due to the execution of the automatic control becomes a larger value.

In the process in S105, the amount of temperature rise TU is calculated based on the margin length $\Delta L$ with reference to a map defining a relationship between the margin length $\Delta L$ and the amount of temperature rise of the motor 2a. The amount of temperature rise TU calculated in this step becomes small as indicated by, for example, a solid line in FIG. 12 along with an increase of the margin length ΔL.

After the amount of temperature rise TU is calculated in S105, the process progresses to S106, which corresponds to the process (b). In the process in S106, the electronic control unit 9 calculates, based on the amount of temperature rise TU and the current value of the temperature Tr of the motor 2a, the predicted temperature T1 of the motor 2a when the automatic control is performed on the steering device 2 using the following expression.

$$T1=Tr+TU \qquad (1)$$

Next, as processes corresponding to the process (c), the electronic control unit 9 executes processes in S107 to S109. That is, as a process in S107, the electronic control unit 9 determines whether or not the predicted temperature T1 is equal to or higher than the determination value. The determination value employed in this step is a value within a temperature range of the motor 2a that does not bring about a failure of the motor 2a and is a value near the upper limit of such a temperature range. Subsequently, when the determination result in S107 is NO, the process progresses to S108. As a process in S108, the electronic control unit 9 inhibits the execution of the automatic control of the steering device 2. In contrast, when the determination result in S107 is YES, the process progresses to S109. The electronic control unit 9 permits the execution of the automatic control of the steering device 2 as a process in S109, and executes the automatic control through a process in following S110.

According to the above-described embodiment, the following advantage is achieved.

(1) When, as a parking assist through an automatic control of the steering device 2, the above-described entry assist or exit assist is executed, the amount of temperature rise TU of the motor 2a that accompanies to the execution of the automatic control is calculated based on the margin (in this embodiment, the margin length ΔL) of the dimension of the parking space P1 relative to the size of the vehicle A. More specifically, the amount of temperature rise TU is calculated in such a way that the smaller the value of the margin length ΔL is, the larger the amount of temperature rise TU becomes. Moreover, the amount of temperature rise TU is added to the current value of the temperature Tr of the motor 2a to calculate the predicted temperature T1 of the motor 2a subjected to a temperature rise that accompanies the execution of the automatic control. Next, when the predicted temperature T1 is equal to or higher than the determination value, the execution of the automatic control is inhibited.

In contrast, when the predicted temperature T1 is lower than the determination value, the execution of the automatic control is permitted. Hence, only when it is predicted that the temperature of the motor 2a becomes a high temperature that is equal to or higher than the determination value due to the execution of the automatic control of the steering device 2, the execution of the automatic control is inhibited, but the execution of the automatic control is permitted in other cases. Accordingly, the opportunities for executing the automatic control of the steering device 2 can be increased as much as possible. Moreover, whether to permit or inhibit the execution of the automatic control of the steering device 2 is determined prior to the execution of the automatic control. Next, after the execution of the automatic control is permitted and is started, the automatic control is not terminated due to a temperature rise of the motor 2a until the entry or exit of the vehicle A with respect to the parking space P1 through the automatic control completes. For example, the above-described embodiment may be modified as follows.

The amount of temperature rise of the motor 2a that accompanies to the execution of the automatic control of the steering device 2 is affected by a difference in the air-pressure of the steerable wheels, and a difference in weight of the whole vehicle A due to, for example, a difference in number of occupants. Information on such air-pressure of the steerable wheels and weight of the whole vehicle A may be input by the driver through an operation to the display panel 3, and such information may be considered when the electronic control unit 9 calculates the amount of temperature rise TU. In this case, the amount of temperature rise TU to be calculated can be a further accurate value.

Two different maps may be employed for calculating the amount of temperature rise TU. That is, a map that is used when the vehicle A enters the parking space P1 and a map that is used when the vehicle A exits the parking space P1 may be employed.

Instead of calculating the amount of temperature rise TU with reference to the map based on the margin length ΔL, the amount of temperature rise TU may be calculated using a calculation formula. In this case, a path for allowing the vehicle A to enter or exit the parking space P1 is obtained based on a margin (margin length ΔL) of the dimension of the parking space P1 relative to the size of the vehicle A. Next, in order to cause the vehicle A to move along the path, when an automatic control of the steering device 2 is performed, power consumed by the motor 2a, and the amount of temperature rise (corresponding to the amount of temperature rise TU) of the motor 2a when such power is consumed are calculated through the calculation formula. The amount of temperature rise of the motor 2a when the automatic control of the steering device 2 is performed varies depending on the path for allowing the vehicle A to enter or exit the parking space P1, and such a path varies depending on the margin (margin length ΔL). Hence, as described above, by calculating the amount of temperature rise TU of the motor 2a when the automatic control of the steering device 2 is performed, the calculated amount of temperature rise TU can be a further accurate value, and thus the predicted temperature T1 of the motor 2a can be a further accurate value.

When a path for allowing the vehicle A to enter or exit the parking space P1 is obtained as described above to calculate the amount of temperature rise TU, in addition to the margin (margin length ΔL) of the dimension of the parking space P1 relative to the size of the vehicle A, it is preferable to consider the dimensions of the peripheral spaces P2 and P3 utilized for the vehicle A to enter or exit the parking space P1. The optimized path for allowing the vehicle A to enter or exit the parking space P1 through an automatic control of the steering device 2 varies depending on not only the margin (margin length ΔL) of the dimension of the parking space P1 relative to the size of the vehicle A but also the dimensions of the peripheral spaces P2 and P3 utilized for the vehicle A to enter or exit the parking space P1. Hence, by obtaining the path as described above, such a path can be a route having the minimum amount of temperature rise TU of the motor 2a when an automatic control of the steering device 2 is performed. As a result, the predicted temperature T1 of the steering device 2 (motor 2a) can be suppressed to a lower value, and thus the opportunities for executing the automatic control of the steering device 2 can be increased.

When a path for allowing the vehicle A to enter the parking space P1 is obtained as described above to calculate the amount of temperature rise TU, it is not always necessary that such a path be a path until the vehicle A completes parking at the parking space P1, but may be a path up to a first entry of the vehicle A to the parking space P1. In this case, by performing an automatic control of the steering device 2 to cause the vehicle A to move along the obtained path, the automatic control is performed until the vehicle A first enters the parking space P1. Subsequently, the driver attempts to complete the parking of the vehicle A at the parking space P1 through a manual steering operation. Hence, the moving distance when the vehicle A is caused to move along the path through the automatic control of the steering device 2 becomes short, and thus the amount of temperature rise TU of the motor 2a that accompanies the execution of the automatic control can be suppressed to a low level. As a result, the predicted temperature T1 of the steering device 2 can be suppressed to a low value, and thus the opportunities for executing the automatic control of the steering device 2 can be increased. Moreover, when the amount of temperature rise TU is calculated with reference to the map based on the margin length ΔL as described above, the map is set to correspond to the path becoming short. The amount of temperature rise TU calculated with reference to the map changes, with respect to a change in the margin length ΔL, for example, as indicated by a broken line in FIG. 12, in a region lower than the solid line in the drawing.

When a path for allowing the vehicle A to enter the parking space P1 is obtained as described above to calculate the amount of temperature rise TU like the above-described embodiment, and when the path is set to be a path up to a completion of the parking of the vehicle A at the parking space P1, the following advantage is achieved. That is, by performing an automatic control of the steering device 2 to move the vehicle A along the obtained path, the automatic control is continuously performed after the vehicle starts entering the parking space P1 until the parking of the vehicle A at the parking space P1 completes, and thus a burden for the driver when attempting to park the vehicle A at the parking space P1 can be further reduced.

The automatic control of the steering device 2 is applied to the parking (entry) of the vehicle A at the parking space P1 in a parking condition (parallel parking) in which the vehicle A is between the other vehicles B and C in the fore-and-aft direction of the vehicle A in the parking space P1, and to the start (exit) from the parking space P1, but the applied cases of the automatic control are not limited to those cases. For example, the automatic control of the steering device 2 may be applied to the parking (entry) of the vehicle A at the parking space P1 in a parking condition (double parking) in which the vehicle A is located between the other vehicles B and C in the parking space P1 in the lateral direction of the vehicle A, and to the start (exit) of the vehicle A from the parking space P1.

In this case, when an entry assist is started as a parking assist, and when the electronic control unit 9 instructs the driver to perform a measurement starting operation as a preparation for measuring the dimension of the parking space P1, such an instruction is given as follows.

Figure 13:
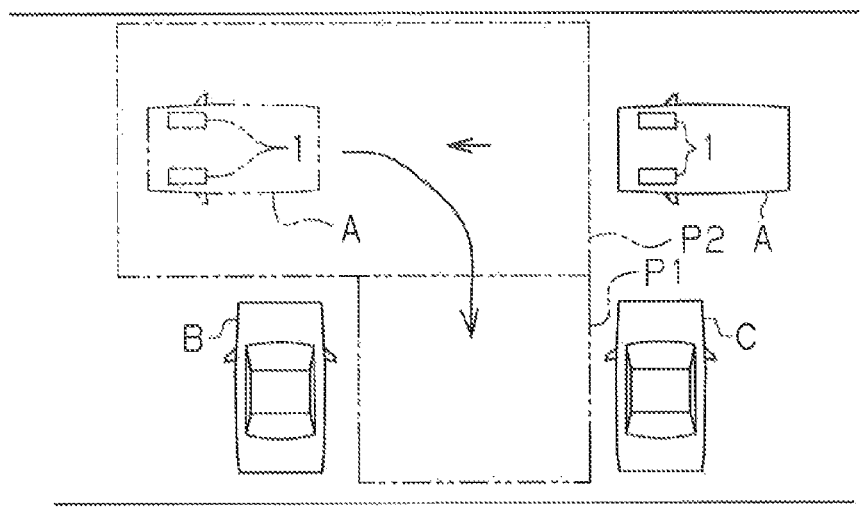
FIG. 13 is a schematic diagram illustrating a motion of a vehicle when the dimension of a parking space is measured.

The driver is instructed to stop the vehicle A at a position indicated by solid lines in FIG. 13, i.e., a position an area in front of the parking space P1 between the other vehicles B and C, or a position from which the vehicle A can reach the area in front of the parking space P1 immediately after starting to advance. Moreover, with the vehicle A being stopped at this position, the driver is instructed to cancel a depressing operation to the brake pedal 14 and to shift the shift lever 10 to the drive position. Upon execution of the measurement starting operation by the driver, the electronic control unit 9 starts a measuring process for measuring the dimension of the parking space P1. In this measuring process, the vehicle A is moved from the position indicated by the solid lines to a position indicated by broken lines in which a long dash alternates with a pair of short dashes, i.e., a position right after the vehicle A passes through the area in front of the parking space P1, and is stopped at this position. While the vehicle A moves from the position indicated by the solid lines to the position indicated by the broken lines in which a long dash alternates with a pair of short dashes, the electronic control unit 9 monitors signals from the clearance sonars 5 and 7 and the ultrasound sensors 6 and 8, and learns the dimension of the parking space P1, and the relative position of the vehicle A to the parking space P1 based on the signals from the sensors. Subsequently, the electronic control unit 9 obtains a path for allowing the vehicle A to enter the parking space P1 from the position indicated by the broken lines in which a long dash alternates with a pair of short dashes based on the margin of the dimension of the parking space P1 relative to the size of the vehicle A, and performs an automatic control of the steering device 2 to move the vehicle A along this path.

Moreover, when an exit assist is started as a parking assist, and when the electronic control unit 9 instructs the driver to perform a measurement starting operation as a preparation for measuring the dimension of the parking space P1, such an instruction is given as follows. With the vehicle A being in the parking space P1 as indicated by solid lines in FIG. 14, the driver is instructed to cancel a depressing operation to the brake pedal 14 and to shift the shift lever 10 to the drive position. Upon execution of the measurement starting operation by the driver, the electronic control unit 9 executes a measuring process for measuring the dimension of the parking space P1. In this measuring process, the vehicle A is reciprocated back and forth so as not to hit obstacles. Moreover, the electronic control unit 9 monitors signals from the clearance sonars 5 and 7 and the ultrasound sensors 6 and 8 during the reciprocal movement, and learns the dimension of the parking space P1 and the relative position of the vehicle A to the parking space P1 based on the signals from the sensors. Subsequently, the electronic control unit 9 obtains a path for allowing the vehicle A to exit the parking space P1 where the vehicle A is parked based on a margin of the dimension of the parking space P1 relative to the size of the vehicle A, and performs an automatic control of the steering device 2 to move the vehicle A along the path.

Figure 14:
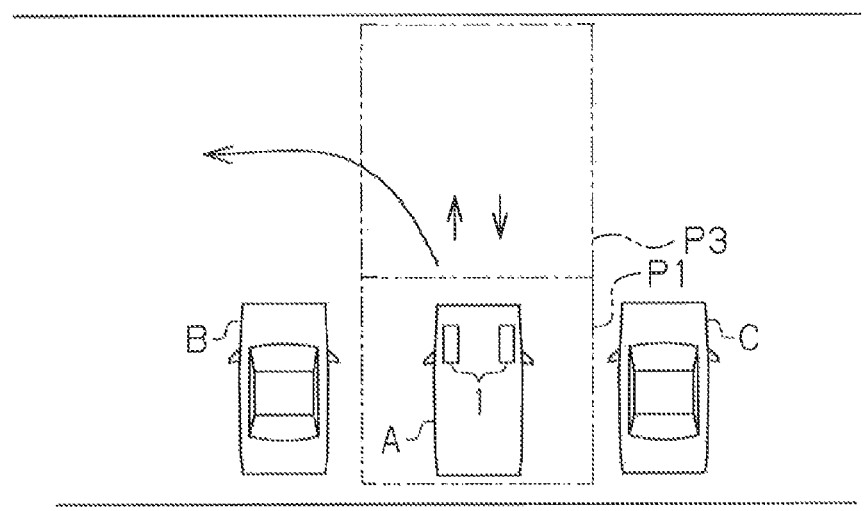
FIG. 14 is a schematic diagram illustrating a motion of a vehicle when the dimension of a parking space is measured.

As the margin utilized in such entry assist or exit assist, a margin width ΔW may be employed that is a value obtained by subtracting the width of the vehicle A in the lateral direction (whole width) from the width of the parking space P1 corresponding to the lateral direction of the vehicle A (the dimension in the horizontal direction in FIGS. 13 and 14). Moreover, when a path for allowing the vehicle A to enter or exit the parking space P1 is obtained, it is preferable to also consider the peripheral spaces P2 and P3 in addition to the above-described margin.

As a temperature of the steering device 2, instead of employing the temperature of the motor 2a, the temperature of the ECU that controls the motor 2a may be employed. In this case, the temperature of the ECU is detected by the temperature sensor 18.

The parking assist device may be exclusive for only the entry assist or the exit assist.

DESCRIPTION OF THE REFERENCE NUMERALS

1 Steerable wheel
2 Steering device

2a Motor
3 Display panel
4 Speaker
5 Clearance sonar
6 Ultrasound sensor
7 Clearance sonar
8 Ultrasound sensor
9 Electronic control unit
10 Shift lever
11 Shift position sensor
12 Accelerator pedal
13 Accelerator position sensor
14 Brake pedal
15 Brake switch
16 Wheel speed sensor
17 Angular sensor
18 Temperature sensor

The invention claimed is:

1. A parking assist device that assists entry or exit of a vehicle with respect to a parking space through an automatic control of a steering device, the parking assist device comprising:
a first calculator that calculates, before the automatic control of the steering device is performed, an amount of temperature rise of the steering device accompanying execution of the automatic control of the steering device based on a margin of a dimension of the parking space relative to the size of the vehicle;
a second calculator that calculates, before the automatic control of the steering device is performed, a predicted temperature of the steering device at the execution of the automatic control by adding the amount of temperature rise calculated by the first calculator to a current value of the temperature of the steering device; and
a controller that determines, before starting the execution of the automatic control, whether to permit or inhibit the execution of the automatic control, wherein the controller permits and starts the execution of the automatic control when the predicted temperature calculated by the second calculator is lower than a determination value and inhibits the execution of the automatic control when the predicted temperature is equal to or higher than the determination value.

2. The parking assist device according to claim 1, wherein the first calculator obtains a path for allowing the vehicle to enter or exit the parking space based on the margin of the dimension of the parking space relative to the size of the vehicle and calculates the amount of temperature rise of the steering device at the execution of the automatic control of the steering device for allowing the vehicle to move along the obtained path.

3. The parking assist device according to claim 2, wherein when obtaining the path for allowing the vehicle to enter or exit the parking space, the first calculator considers, in addition to the margin of the dimension of the parking space relative to the size of the vehicle, a dimension of a peripheral space utilized for the vehicle to enter or exit the parking space.

4. The parking assist device according to claim 2, wherein the first calculator obtains, as the path for allowing the vehicle to enter the parking space, a path by which parking of the vehicle at the parking space is completed.

5. The parking assist device according to claim 2, wherein the first calculator obtains, as the path for allowing the vehicle to enter the parking space, a path by which the vehicle starts to enter the parking space.

6. A parking assist device that assists entry or exit of a vehicle with respect to a parking space through an automatic control of a steering device, the parking assist device comprising:
a calculator, wherein, before the automatic control of the steering device is performed, the calculator obtains a path for allowing the vehicle to enter or exit the parking space based on the parking space, calculates an amount of temperature rise of the steering device at the execution of the automatic control for allowing the vehicle to move along the obtained path, and calculates a predicted temperature of the steering device at the execution of the automatic control by adding the calculated amount of temperature rise to a current value of the temperature of the steering device; and
a controller that determines, before starting the execution of the automatic control, whether to permit or inhibit the execution of the automatic control, wherein the controller inhibits the execution of the automatic control when the predicted temperature calculated by the calculator is equal to or higher than a determination value, and permits and starts the execution of the automatic control when the predicted temperature is lower than the determination value.

7. The parking assist device according to claim 6, wherein the calculator calculates the amount of temperature rise of the steering device accompanying execution of the automatic control of the steering device based on a dimension of the parking space.

8. The parking assist device according to claim 6, wherein the calculator calculates the amount of temperature rise of the steering device accompanying execution of the automatic control of the steering device based on a margin of a dimension of the parking space relative to the size of the vehicle.

9. A parking assist device that assists entry or exit of a vehicle with respect to a parking space through an automatic control of a steering device, the parking assist device comprising:
a calculator, wherein, before the automatic control of the steering device is performed, the calculator obtains a path for allowing the vehicle to enter or exit the parking space based on the parking space and calculates a predicted temperature of the steering device at the execution of the automatic control for allowing the vehicle to more along the obtained path; and
a controller that determines, before starting the execution of the automatic control, whether to permit or inhibit the execution of the automatic control, wherein the controller inhibits the execution of the automatic control when the predicted temperature calculated by the calculator is equal to or higher than a determination value, and permits and starts the execution of the automatic control when the predicted temperature is lower than the determination value.

10. The parking assist device according to claim 1, wherein, after the execution of the automatic control is permitted and started, the controller continues the automatic control without terminating until the entry or exit of the vehicle with respect to the parking space completes.

11. The parking assist device according to claim 6, wherein, after the execution of the automatic control is permitted and started, the controller continues the automatic control without terminating until the entry or exit of the vehicle with respect to the parking space completes.

12. The parking assist device according to claim 9, wherein, after the execution of the automatic control is permitted and started, the controller continues the automatic control without terminating until the entry or exit of the vehicle with respect to the parking space completes.

* * * * *